April 22, 1952 J. BOUVAT-MARTIN 2,593,654
MECHANICAL LUBRICATION OF AXLE BOXES
Filed Feb. 7, 1947 3 Sheets-Sheet 2

INVENTOR
Jean Bouvat-Martin
BY: John R. Graham
ATTORNEY.

Patented Apr. 22, 1952

2,593,654

UNITED STATES PATENT OFFICE 2,593,654

MECHANICAL LUBRICATION OF AXLE BOXES

Jean Bouvat-Martin, Paris, France, assignor to Societe-Anonyme dite: Societe Generale Isothermos, Paris, France Application February 7, 1947, Serial No. 727,097
In France August 30, 1946

3 Claims. (Cl. 308—85)

It is well known to provide for automatic lubrication in axle-boxes with the aid of one or two oil-gathering paddles. The said paddles partake of the rotation of the journal and take the oil from a receptacle located within the lower portion of the axle-box. These paddles have dissymmetrical ends and preferably are provided with dripping points. The paddle or paddles by revolving will provide for the conveyance and dripping of the oil into channels in the top of the bearing.

Oil deflecting and recovering discs are also known which are effective to avoid oil losses in said axle-boxes, which losses result from oil being splashed laterally, above all at high running speeds; such oil deflecting and recovering discs will work satisfactorily where the axle undergoes only small longitudinal displacements, but insufficiently where such displacements are considerable. The result is then oil losses due to the said displacements of the journal in its bearing and also to sudden tilting movements of the axle and the box in curves due to the cant.

It is also well known that the shape of the inside walls of the box is of considerable importance in avoiding losses of oil thrown away by the deflecting disc or discs. Effectively, at high running speeds, the centrifugal effect becomes so strong that the oil is hurled against the inner surfaces of the box body in such manner that it will spread into the remote portions of the box and finally leak out of it where precisely the inner walls are not properly designed.

This invention has for its object various improvements made in the aforesaid designs and arrangements adapted to remedy all these inconveniences by their combination into a unitary device applicable notably to inside axle-boxes on high-speed locomotives, in which an account has to be taken of a longitudinal displacement of the journal of the order of several centimeters.

Figure 1:
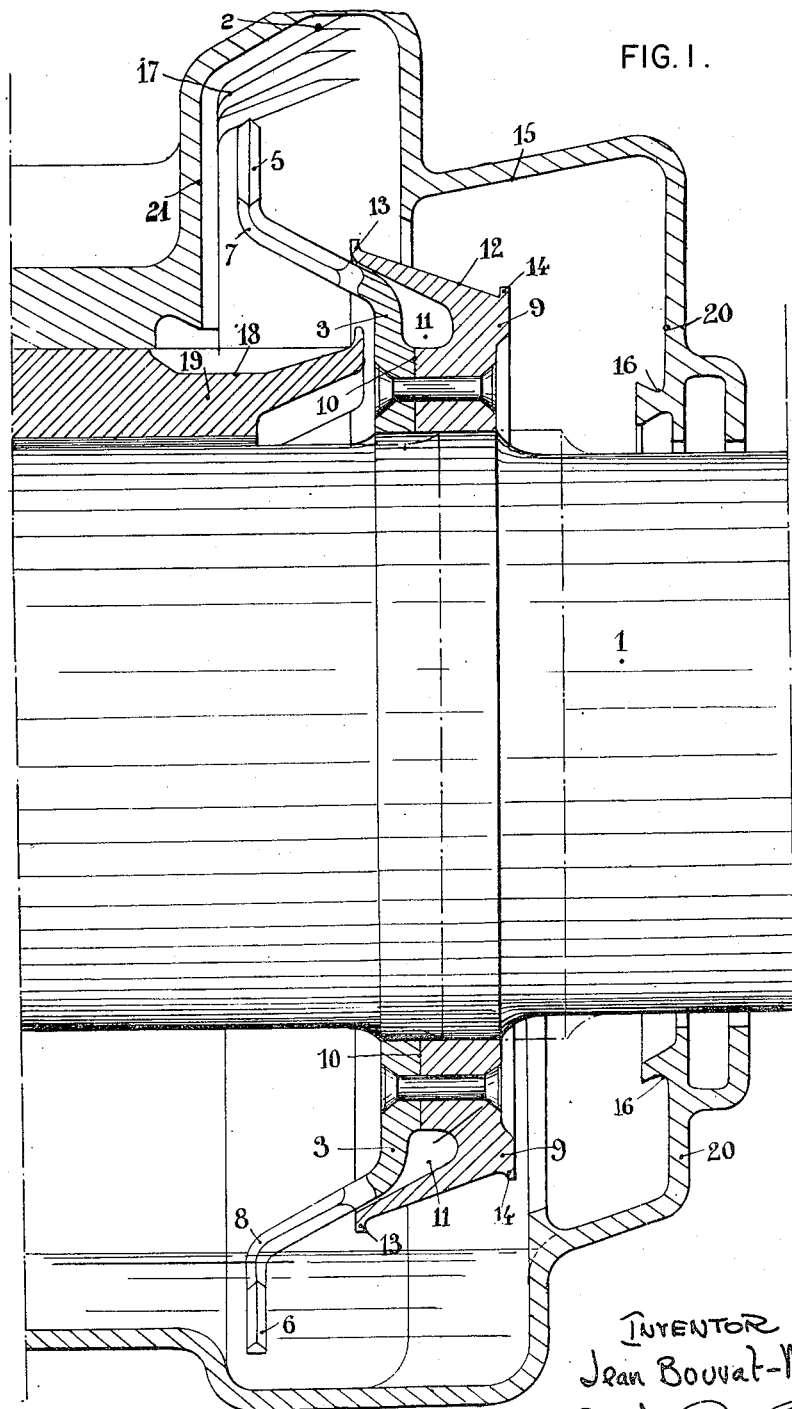
Figure 2:
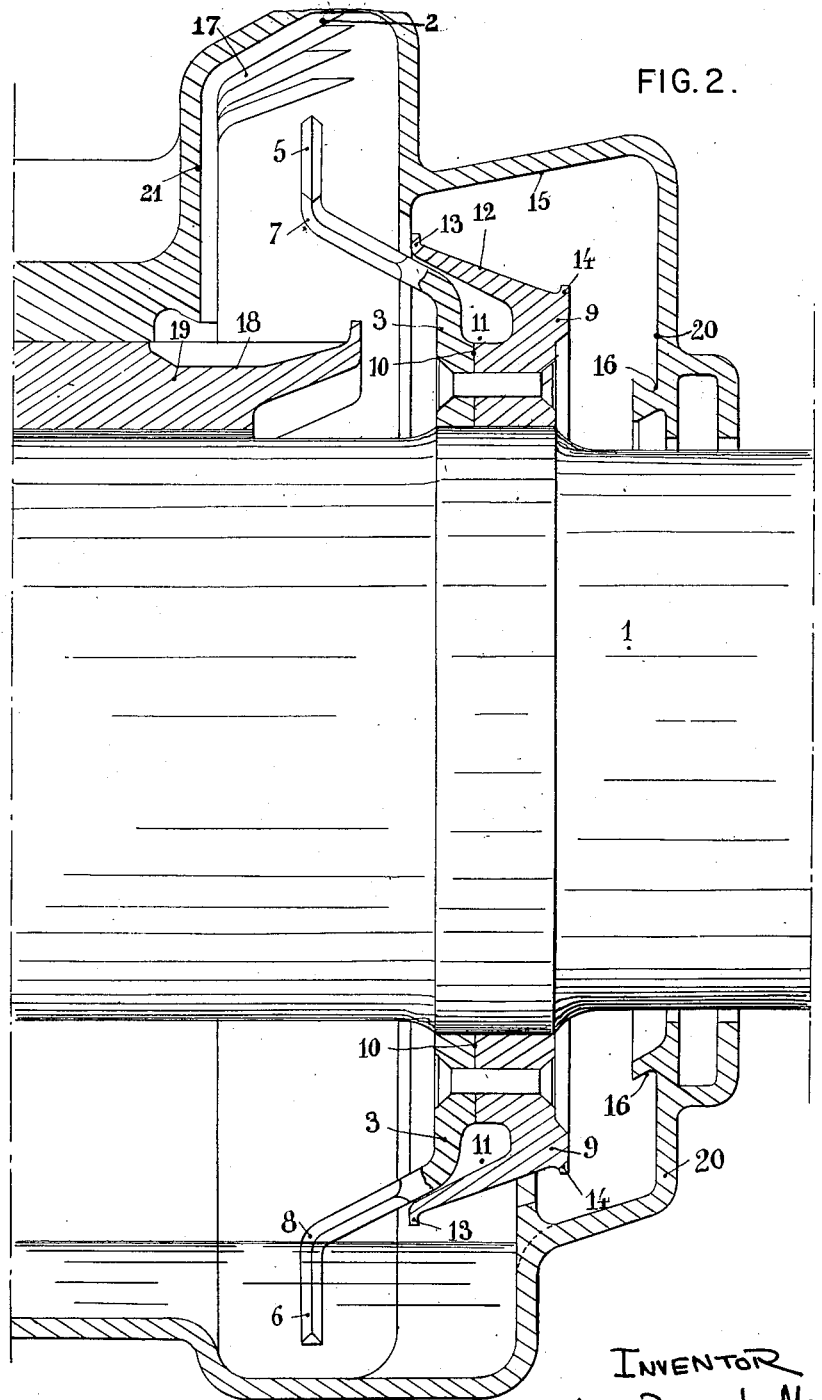
Figure 3:
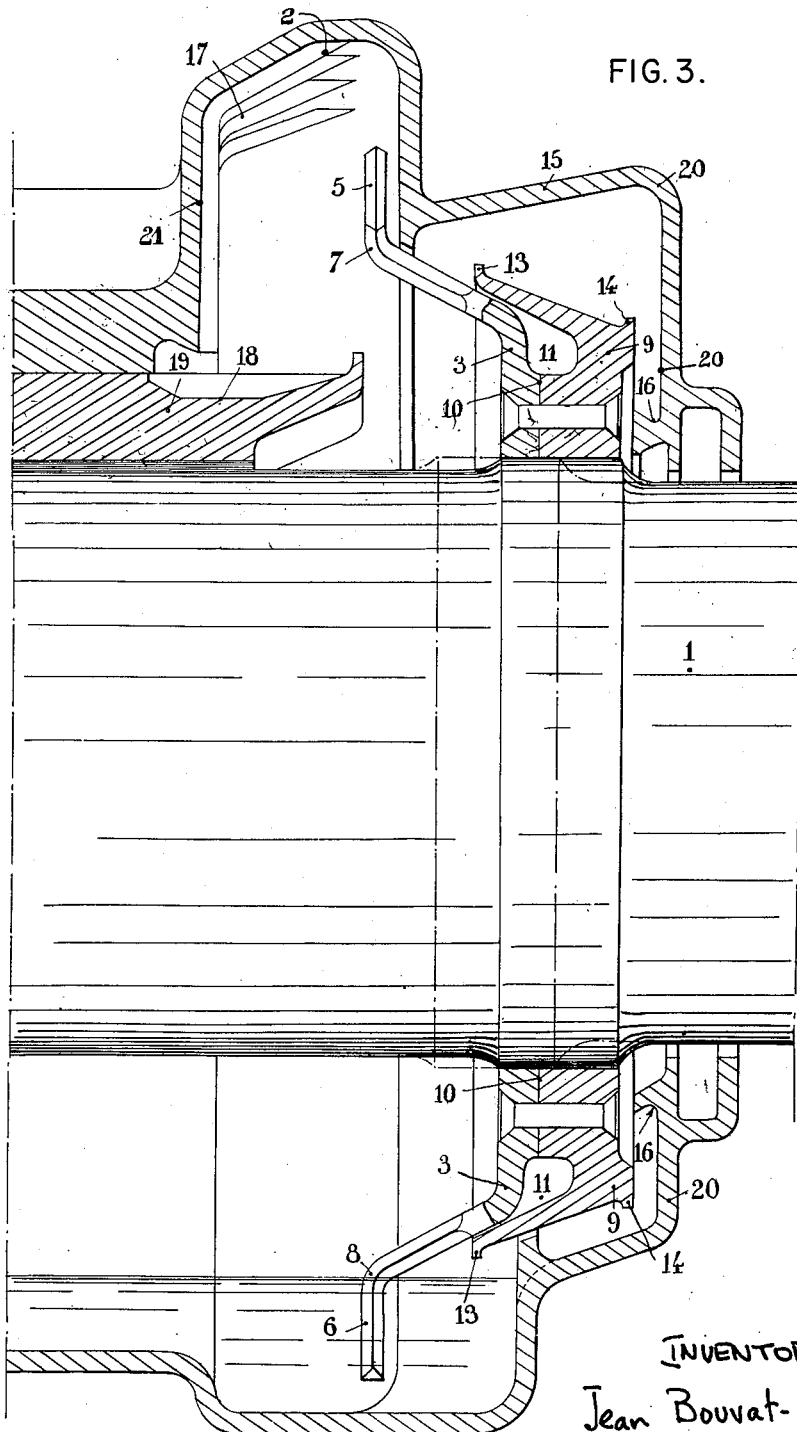

A description of an embodiment of the invention is given hereinafter, reference being had to the appended drawings in which:

Figures 1, 2 and 3 are longitudinal sectional views, taken on the axis of the axle, of an axle-box according to the invention and showing the journal in three positions depending on the direction in which the track is curved.

The axle 1 which projects through the axle-box 2 is rigid with a disc or ring 9 formed on its side next to the bearing 19 with paddles 7, 8 having angularly disposed oil-scooping ends 5 and 6. The bend is such that the paddles (5 or 6) in their revolution will always move above the basin 18 in the bearing 19, and this, irrespective of the displacement of the axle (Figs. 1, 2, 3).

The deflecting and recovering disc 9 which is jointed with the paddle 3 on their trued faces 10 may be integral therewith. Provided between the inner face of the deflecting and recovering disc and the disc proper is a recess 11 in which the oil can be collected and retained, and from which it can flow at rest. Said recess may be variously shaped; in some instances it may even be dispensed with. The rim portion 12 of said deflecting and recovering disc comprised between the pair of flanges 13 and 14 has a suitable slope whose angle may differ depending on the applications and on the viscosity of the oil used. This carefully calculated slopt will enable such oil as may fall on the rim 12 to creep therealong as a result of the centrifugal effect towards the flange 13 by which it will be hurled towards the upper wall of the box at 15. This portion 15 of the box has also a suitable and calculated slope in such manner that in the displacements of the axle the oil shall always be diverted towards the rim 12 wherefrom it will flow back into the oil sump by gravity.

Owing to that arrangement no oil particle is liable to move past the vertical plane through flange 14 and to be present on the wall 20. However, as a safety measure and an additional precaution, a small V-shaped groove 16 is provided on the front inside wall 20 of the box; this groove would collect the small amount of oil that in spite of all might have reached the axle-box end and would gather it to return it thereafter to the oil sump.

In order that the oil splashed at high speeds may be led to the bearing, grooves 17 are provided in the crown of the axle-box and in the face 21 thereof whereby the oil is directed towards the bearing at 18.

Figs. 1, 2 and 3 show that the arrangements described are effective as a joint result of:

1. The length of the bend 7 on the paddles and the arrangement of the deflecting and recovering disc 9 close thereto;

2. The width of the rim 12 and its slope between the flanges 13 and 14;

3. The slopes of the box crowns 2 and 15 above the paddle and the deflecting and recovering disc; irrespective of the displacements and inclinations of the axle and the axle-box, no interference with the operation of the lubricating device or with the flow of oil towards the bearing and back to the oil sump will be experienced.

What I claim as my invention and desire to secure by Letters Patent is:

1. In a lubricating system for an axle box involving, a bearing an oil-receiving basin in the upper surface of said bearing, an axle box an oil supply located in the bottom of said axle box, an axle journalled in said bearing, oil scooping paddles rotatable with said axle for conveying oil from said supply to said basin and an oil-recovering and deflectin gring rotatable with said axle, the provision of means for supplying oil to said bearing irrespective of the rotational speed and longitudinal play of said axle comprising two interconnecting longitudinally arranged lubricating and oil-recovering chambers in said axle box, the wall of said oil-recovering chamber arranged along the axis of said axle being inclined away from said axis in one direction, said oil-recovering ring journalled to said axle within said oil-recovering chamber, a rim on said ring being inclined away from said axis in the other direction, arms on said ring extending into said lubricating chamber, and oil paddles secured to said arms, said arms extending longitudinally of said axis a distance at least equal to the maximum longitudinal play of said axle.

2. A lubricating system as claimed in claim 1 further comprising annular flanges on said inclined rim of said oil-recovering ring.

3. A lubricating system as claimed in claim 2 in which said inclined rim and said arms form at their junctures with said ring, oil-receiving recessed portions.

JEAN BOUVAT-MARTIN.

REFERENCES CITED

The following references are of record in the file of this patent:

UNITED STATES PATENTS

| Number | Name | Date |
|---|---|---|
| 1,797,791 | Peyinghaus | Mar. 24, 1931 |
| 2,026,504 | Albeck | Dec. 31, 1935 |

FOREIGN PATENTS

| Number | Country | Date |
|---|---|---|
| 27,932 | Great Britain | Dec. 7, 1906 |
| 51,373 | Norway | Aug. 29, 1932 |
| 553,827 | Germany | June 30, 1932 |